United States Patent [19]
Miyauchi et al.

[11] Patent Number: 5,852,533
[45] Date of Patent: Dec. 22, 1998

[54] MAGNETORESISTANCE EFFECT TRANSDUCER ELEMENT WITH CONTINUOUS CENTRAL ACTIVE AREA

[75] Inventors: Daisuke Miyauchi, Tokyo; Eiichi Omata, Saku; Hajime Amano, Saku; Tetsuro Sasaki, Saku; Yasufumi Uno, Nagano, all of Japan

[73] Assignee: TDK Corporation, Tokyo, Japan

[21] Appl. No.: 686,717

[22] Filed: Jul. 26, 1996

[30] Foreign Application Priority Data

Jul. 28, 1995 [JP] Japan .................................. 7-193619

[51] Int. Cl.$^6$ ...................................................... G11B 5/39
[52] U.S. Cl. .............................................................. 360/113
[58] Field of Search ................................... 360/113, 126; 324/252; 338/32 R

[56] References Cited

U.S. PATENT DOCUMENTS

| | | | |
|---|---|---|---|
| 4,103,315 | 7/1978 | Hempstead et al. | 360/110 |
| 4,663,685 | 5/1987 | Tsang | 360/113 |
| 4,713,708 | 12/1987 | Krounbi et al. | 360/113 |
| 5,018,037 | 5/1991 | Krounbi et al. | 360/113 |
| 5,206,590 | 4/1993 | Dieny et al. | 360/113 |
| 5,287,238 | 2/1994 | Baumgart et al. | 360/113 |
| 5,576,915 | 11/1996 | Akiyama et al. | 360/113 |
| 5,641,557 | 6/1997 | Ishiwata | 428/209 |
| 5,648,885 | 7/1997 | Nishioka et al. | 360/113 |

FOREIGN PATENT DOCUMENTS

| | | | |
|---|---|---|---|
| 6-195645 | 7/1994 | Japan | 360/113 |
| 6-203333 | 7/1994 | Japan | 360/113 |

OTHER PUBLICATIONS

Ching Tsang, et al., "Design, Fabrication & Testing of Spin–Valve Read Heads for High Density Recording", IEEE Transactions on Magnetics, vol. 30, No. 6, Nov. 1994, pp. 3801–3806.

B. Dieny, et al., "Giant Magnetoresistance in Soft Ferromagnetic Multilayers", Physical Review B, vol. 43, No. 1, Jan. 1, 1991, pp. 1297 to 1300.

Tsann Lin, et al., "Improved Exchange Coupling Between Ferromagnetic Ni–Fe and Antiferromagnetic Ni–Mn–Based Films", American Institute of Physics, Applied Physics Letter 65 (9), Aug. 29, 1994, pp. 1183–1185.

S. Okitsu, et al., "Performance Improvement of Exchange Biasing MR Heads", Japanese Institute of Applied Magnetics No. 18, 1994, pp. 132a to 132b.

*Primary Examiner*—Stuart S. Levy
*Assistant Examiner*—David D. Davis
*Attorney, Agent, or Firm*—Oblon, Spivak, McClelland, Maier & Neustadt, P.C.

[57] ABSTRACT

The present invention is directed to a magnetic transducer element with outstanding productivity, with which the track width can be defined to a high degree of accuracy and required magnetic characteristics can be reliably imposed upon the central active area. Laminated films which generate a magnetoresistance effect, a magnetic domain control film, which applies a magnetic bias to the laminated films and a pair of lead conductor films are provided. The laminated films and the magnetic domain control film are laminated to each other to constitute a central active area. The lead conductor films terminate the side end surfaces of the central active area at the two sides in direction running at a right angle to direction of the lamination of the central active area.

18 Claims, 3 Drawing Sheets

MAGNETORESISTANCE EFFECT TRANSDUCER ELEMENT WITH CONTINUOUS CENTRAL ACTIVE AREA

BACKGROUND OF THE INVENTION

1. Field of the Invention

The present invention relates to a magnetic transducer element and a thin film magnetic head.

2. Discussion of Background

In the current trend for miniaturization of magnetic disk drive devices, a thin film magnetic head that employs a magnetic transducer element which, in turn, takes advantage of the magnetoresistance effect, is considered, in the prior art, to be a magnetic transducer ideally suited for reading information that has been stored on a magnetic recording medium at a high recording density, since its output is not affected by its speed relative to the magnetic disk. Typical examples of such magnetic transducer elements include a magnetic transducer element that employs an anisotropic magnetoresistance effect element constituted of, for instance, permalloy.

A magnetic transducer element utilizing an anisotropic magnetoresistance effect element requires two bias magnetic fields in order to achieve optimal operation. In other words, it requires a transverse bias magnetic field and a longitudinal bias magnetic field. The transverse bias magnetic field is applied to an external magnetic field to be detected so that the resistance change caused by the magnetoresistance effect manifests symmetrically and linearly with the zero field set as the center. The means for achieving this in the prior art include the SAL (soft adjacent layer) bias and the shunt bias. The SAL bias is achieved by laminating an anisotropic magnetoresistance effect film and a transverse bias film to each other via a magnetic separation film. The transverse bias film is constituted with a soft magnetic film while the magnetic separation layer is constituted with a non-magnetic film.

The longitudinal bias magnetic field is provided to suppress the Barkhausen noise generated when the magnetic walls of the anisotropic magnetoresistance effect element move. The means for applying a longitudinal bias magnetic field include the exchange-coupling bias method, which utilizes an exchange-coupling between an anti-ferromagnetic film and the anisotropic magnetoresistance effect film, and the hard magnet bias method.

The exchange-coupling bias method is disclosed in Japanese Unexamined Patent Publication No. 40610/1987 and U.S. Pat. No. 4,103,315. The magnetic transducer element disclosed in either of these prior art publications includes a pair of magnetic domain control films that are laminated over a distance from each other at two sides that face opposite each other across an anisotropic magnetoresistance effect film. Lead conductor films are deposited on the surfaces of the magnetic domain control films over a distance from each other. The magnetic domain control films are anti-ferromagnetic films. With such a magnetic transducer element, the exchange-coupling generated between the anti-ferromagnetic films and the anisotropic magnetoresistance effect film is utilized to apply a consistent longitudinal bias magnetic field to the anisotropic magnetoresistance effect film so that Barkhausen noise, caused by the movement of the magnetic domain, can be prevented. The distance between the anti-ferromagnetic films defines the track width when the magnetic transducer element is used in the magnetic head.

Next, the hard magnetic bias method is disclosed in Japanese Unexamined Patent Publication No. 125311/1991. In this prior art publication, an anisotropic magnetoresistance effect film and a transverse bias film are provided only in the central active area and a hard magnetic bias film is formed in each of end passive areas at the two sides of the central active area with a lead conductor film formed on top of each hard magnetic bias film. The track width corresponds to the width of the anisotropic magnetoresistance effect film. In this structure, a transverse bias magnetic field is generated only in the central active area and the longitudinal bias magnetic field is generated in the end passive areas.

One of the problems with the exchange-coupling bias method disclosed in Japanese Unexamined Patent Publication No. 40610/1987 and U.S. Pat. No. 4,103,315 is that, since the pair of magnetic domain control films are laminated at the two sides facing opposite each other over a distance across the anisotropic magnetoresistance effect film, the lead conductor films are each deposited on the surface of the corresponding magnetic domain control film over a distance from the other and the distance between the magnetic domain control films defines the track width, there is a limit to how much the width of the tracks can be reduced through photolithographic technology.

Another problem of the exchange-coupling bias method described above is that, since the anisotropic magnetoresistance effect film and the SAL film are formed under the end passive areas constituted with the anti-ferromagnetic films and the lead conductor films, the anisotropic magnetoresistance effect film and the SAL film are present in the end passive areas, which do not constitute part of the magnetic transducing area, constitute a source of noise.

Yet another problem of the exchange-coupling bias method is that, since the anti-ferromagnetic films are formed only in the end passive areas, a consistent magnetic anisotropy is not always applied to the anisotropic magnetoresistance effect film in the central active area.

One of the problems of the hard magnet bias method disclosed in Japanese Unexamined Patent Publication No. 125311/1991 is that, since it is necessary to form a hard magnet bias film at each side of a central active area formed by laminating the anisotropic magnetoresistance effect film and the transverse bias film, and it is also necessary to further form a lead conductor film on top of each hard magnet bias film, the manufacturing process becomes complex and, thus, it is not possible to improve productivity.

Another problem of the hard magnet bias method described above is that, since the magnetic field generated from the hard magnetic films has a distribution in the direction in which the hard magnetic films are provided within the central active area, the direction of the magnetization of the anisotropic magnetoresistance effect film will have a distribution in the direction of magnetization, and because of this, the direction of magnetization within the plane of the anisotropic magnetoresistance effect film does not have a consistent inclination of 45° in the magnetic transducing area when the externally applied magnetic field is zero.

SUMMARY OF THE INVENTION

It is an object of the present invention is to provide a magnetic transducer element and a thin film magnetic head with which an effective magnetic transducing area can be defined at a specific value with a high degree of accuracy and, consequently, reduction in the width of the tracks can be supported to achieve optimal operation.

It is a further object of the present invention to provide a magnetic transducer element and a thin film magnetic head in which the end passive areas, which are not taken into consideration as magnetic transducing area, do not constitute a source of noise.

It is a still further object of the present invention to provide a magnetic transducer element and a thin film magnetic head in which a bias magnetic field is generated only in a central active area and specific magnetic characteristics can be imposed upon the central active area.

It is a still further object of the present invention to provide a magnetic transducer element with which outstanding productivity can be achieved and to provide a thin film magnetic head that includes this magnetic transducer element.

It is a still further object of the present invention to provide a magnetic transducer element and a thin film magnetic head that can obtain similar advantages to those obtained when an anisotropic magnetoresistance effect film is employed, even when the central active area has another structure for generating a magnetoresistance effect, such as a spin valve film.

In order to achieve the objects described above, the magnetic transducer element according to the present invention, includes a laminated film that generates a magnetoresistance effect, a magnetic domain control film that exerts magnetic domain control over the laminated film and a pair of lead conductor films. The laminated film and the magnetic domain control film are laminated together to constitute a central active area. The lead conductor films terminate the side end surfaces of the central active area at the two sides in the direction running at a right angle to the direction of the lamination of the central active area.

In the magnetic transducer element described above, the lead conductor films terminate the side end surfaces of the central active area at the two sides in the direction running at a right angle to the direction of the lamination of the central active area. As a result, the effective magnetic transducing area is defined by the width of the central active area measured in the direction of the pair of lead conductor films. Because of this, unlike in the exchange-coupling bias method of the prior art, the effective magnetic transducing area can be defined at a specific value with a high degree of accuracy to support reduction in the width of the tracks. Thus, optimal operation can be assured.

The central active area includes the laminated film that generates a magnetoresistance effect and the magnetic domain control film with the laminated film and the magnetic domain control film laminated to each other. Consequently, the bias magnetic field applied by the magnetic domain control film is generated only in the central active area. Thus, unlike the exchange-coupling bias method of the prior art, no noise that can be attributed to the structure of the end passive areas, which do not constitute part of the magnetic transducing area, is generated.

Moreover, since the laminated film that generates the magnetoresistance effect and the magnetic domain control film are laminated to each other and the bias magnetic field applied by the magnetic domain control film is generated only in the central active area, unlike in the hard magnet bias method of the prior art, it is possible for the magnetic domain control film to exert consistent magnetic domain control over the laminated film which generates the magnetoresistance effect, to reliably impose the required magnetic characteristics in the central active area.

In addition, since the laminated film, which generates the magnetoresistance effect, and the magnetic domain control film are laminated to each other in the central active area, the central active area can be formed through photolithography, forming processes and the like which belong to one and the same manufacturing process. This, in turn, improves productivity.

The central active area is typically formed by using an anisotropic magnetoresistance effect film constituted of, for instance, permalloy, but it may also be constituted with a giant magnetoresistive (hereafter referred to as GMR) effect film configuration, which has been attracting much interest recently. A typical example of a central active area using a GMR effect film configuration is a spin valve film configuration. Other examples include a super-lattice GMR film configuration and a granular GMR film configuration. According to the present invention, the advantages described above are achieved even when another structure for generating a magnetoresistance effect, such as a spin valve film configuration, is adopted as well as when an anisotropic magnetoresistance effect film configuration is employed.

The thin film magnetic head according to the present invention is provided with a magnetic transducer element supported by a slider, which is constituted with the magnetic transducer element according to the present invention described earlier. Because of this, the effects and advantages of the magnetic transducer element according to the present invention are directly preserved in the thin film magnetic head.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENTS

Figure 1:
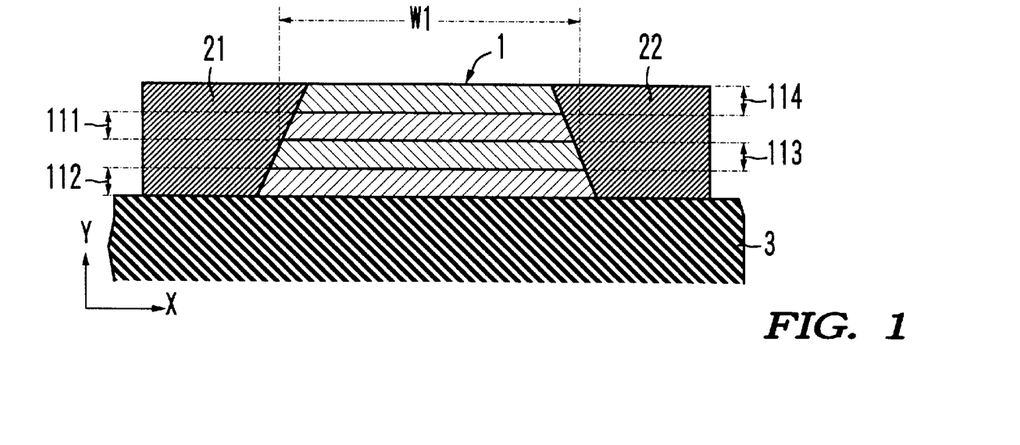
FIG. 1 shows the magnetic transducer element according to the present invention employing an anisotropic magnetoresistance effect film configuration.

Referring to FIG. 1, the magnetic transducer element according to the present invention includes a central active area 1, a pair of lead conductor films 21 and 22 and a supporting body 3. The central active area 1 is provided with a laminated film structure comprising films 111 to 113 that generates a magnetoresistance effect, and a magnetic domain control film 114 which exerts magnetic domain control over the laminated films 111 to 113. The laminated film structure comprising films 111 to 113 is formed by sequentially laminating a plurality of films 111 to 113 on top of the supporting body 3. The lower side of each of the plurality of films 111 to 113 that are laminated covers the entire surface of the film that supports it.

The lead conductor films 21 and 22 are provided on top of the supporting body 3 at the two sides in direction (X) running at a right angle to the direction of the lamination (Y) of the central active area 1, and are in contact with the side end surfaces of the central active area 1 to terminate the side end surfaces of the central active area 1.

As described above, the lead conductor films 21 and 22 terminate the side end surfaces of the central active area at the two sides positioned in the direction running at a right angle to the direction of the lamination of the central active area 1. Thus, the effective magnetic transducing area is defined by the width W1 of the central active area 1 measured in direction (X) of the pair of the lead conductor films 21 and 22. Consequently, unlike the exchange-coupling bias method in the prior art, it is possible to define the effective magnetic transducing area at a specific value with a high degree of accuracy to support reduction in the width of the tracks and optimal operation is thereby assured.

Since the central active area 1 includes the structure comprising laminated films 111 to 113, which generate the magnetoresistance effect, and the magnetic domain control film 114 with the laminated films 111 to 113 and the magnetic domain control film 114 laminated to each other, the bias magnetic field applied by the magnetic domain control film 114 is generated only in the central active area 1. Thus, unlike in the exchange-coupling bias method of the prior art, the end passive areas, which do not constitute part of the magnetic transducing area, do not constitute a source of noise.

In addition, since the structure comprising laminated films 111 to 113, which generate the magnetoresistance effect, and the magnetic domain control film 114 are laminated to each other and the bias magnetic field applied by the magnetic domain control film 114 is generated only in the central active area 1, unlike in the hard magnetic bias method of the known art, a consistent bias magnetic field can be applied to the structure comprising laminated films 111 to 113, which generates the magnetoresistance effect, by the magnetic domain control film 114 so that the magnetic characteristics required in the central active area 1 can be reliably provided.

Moreover, since the structure comprising laminated films 111 to 113 that generate the magnetoresistance effect and the magnetic domain control film 114 are laminated to each other in the central active area 1, the central active area can be formed through photolithography and film-forming processes and the like, which belong in one and the same manufacturing process to improve productivity.

In the embodiment, the central active area 1 includes an anisotropic magnetoresistance effect film 111 constituted of permalloy or the like, a transverse bias film 112, a magnetic separation film 113 and the magnetic domain control film 114.

The magnetic domain control film 114 is laminated to the anisotropic magnetoresistance effect film 111 on the side opposite the transverse bias film 112 and the magnetic separation film 113. The magnetic domain control film 114 is provided on top of the anisotropic magnetoresistance effect film 111. The magnetic domain control film 114 is constituted with an anti-ferromagnetic film. With this, the exchange-coupling bias method, which utilizes an exchange-coupling between the magnetic domain control film 114, constituted with an anti-ferromagnetic film, and the anisotropic magnetoresistance effect film 111, is achieved. With the exchange-coupling bias method, the Barkhausen noise caused by the movement of the magnetic domain is prevented by applying a consistent longitudinal (X direction) bias to the anisotropic magnetoresistance effect film 111.

In the central active area 1, the entire surface of the transverse bias film 112 is covered by the magnetic separation film 113, the entire surface of the magnetic separation film 113 is covered by the anisotropic magnetoresistance effect film 111 and the entire surface of the anisotropic magnetoresistance effect film 111 is covered by the magnetic domain control film 114. In such a structure, no magnetoresistance effect is generated in the end passive areas, which do not constitute part of the magnetic transducing area and, thus, generation of noise signals is suppressed. In addition, since the magnetic domain control film 114, constituted with the anti-ferromagnetic film, is in contact with the anisotropic magnetoresistance effect film 111 over the entire surface, unlike in the hard magnet bias method of the known art, no distribution is generated in the direction of the magnetization of the anisotropic magnetoresistance effect film 111.

Furthermore, the central active area 1 is constituted by sequentially laminating the anisotropic magnetoresistance effect film 111, the transverse bias film 112, the magnetic separation film 113 and the magnetic domain control film 114 on the supporting body 3 in a specific order. This structure makes it possible to form the films described above through photolithographic processes and film forming processes that belong in one and the same manufacturing process. As a result, unlike in the hard magnet bias method of the prior art, productivity is improved.

As explained earlier, the anisotropic magnetoresistance effect film 111 may be constituted of, for instance, permalloy. Its composition, thickness, manufacturing method and the like are known to those ordinary skilled in the art to which the present invention pertains. It goes without saying that materials other than permalloy that demonstrate a large anisotropic magnetoresistance ratio may be used to constitute the anisotropic magnetoresistance effect film 111.

The transverse bias film 112 is a magnetic film without magnetoresistance effect, which is constituted of, for instance, Ni—Fe—Rh, Ni—Fe—Cr or amorphous. The characteristics required of the transverse bias film 112 are mainly that it provides good soft magnetic characteristics, large resistivity and that it does not demonstrate any magnetoresistance effect. Therefore, any material that provides such characteristics may be used.

The magnetic separation film 113 may be constituted of, for instance, a Cu or Ta film. This laminated structure is routinely employed in this type of magnetic transducer element.

The magnetic domain control film 114 may be constituted of NiMn, FeMn, NiO, $C_0O$ or $Fe_2O_3$. NiMn offers superior anti-corrosion properties and thermal stability characteristics to FeMn. The lead conductor films 21 and 22 are each constituted of, for instance, a Ta/W/Ta laminated film.

Figure 2:
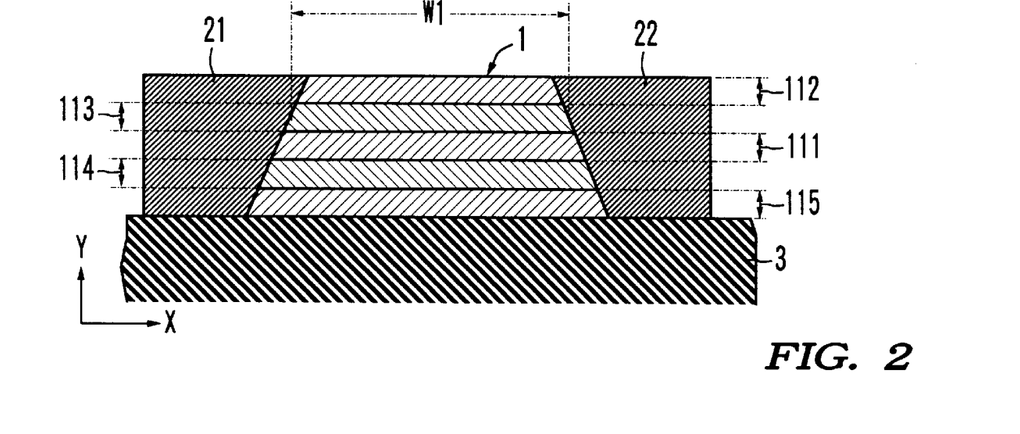
FIG. 2 shows another embodiment of the magnetic transducer element according to the present invention employing an anisotropic magnetoresistance effect film configuration.

The embodiment shown in FIG. 2 differs from the embodiment in FIG. 1 in that the anisotropic magnetoresistance effect film 111 is laminated on top of the magnetic domain control film 114. The magnetic domain control film 114 is laminated on top of a base film 115 provided on a surface of the supporting body 3. Preference for either the embodiment shown in FIG. 1 or the embodiment shown in FIG. 2 is determined by the materials used to constitute the various layers. For instance, if FeMn is used for the anti-ferromagnetic film that constitutes the magnetic domain control film 114, it is necessary to form a γ-FeMn with an fcc-structure and, therefore, if the anisotropic magnetoresistance effect film 111 has an fcc-structure, the embodiment shown in FIG. 1 is preferable.

In the present invention, the central active area 1 may be constituted by utilizing the GMR effect which has been attracting much interest recently. Typical examples in which the GMR effect is employed include a super-lattice GMR film structure, a granular GMR film structure as well as a spin valve film structure.

Magnetoresistive sensors that use a spin valve film structure are disclosed in Japanese Unexamined Patent Publication No. 358310/1992 and IEEE Transactions On Magnetics, Vol. 30, No. 6, November 1994.

Figure 3:
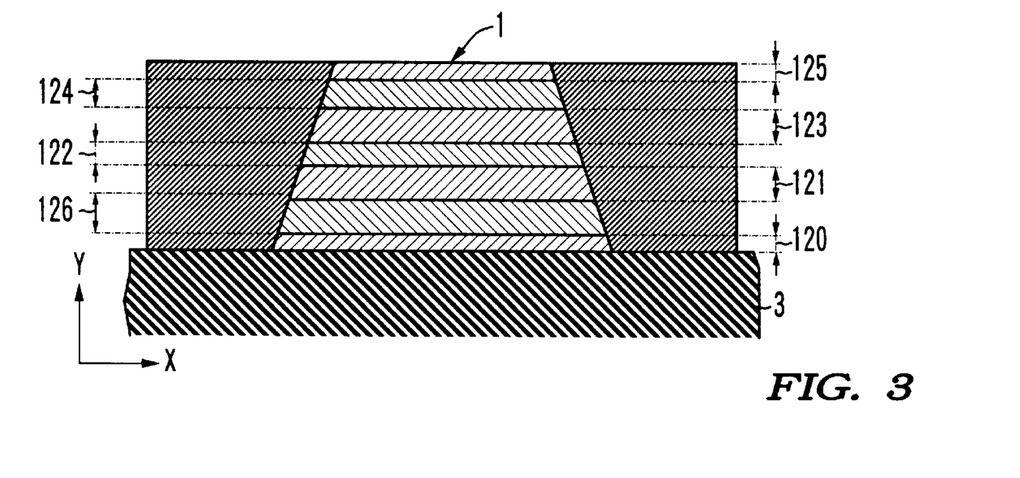
FIG. 3 shows the magnetic transducer element according to the present invention employing a spin valve film configuration.
Figure 4:
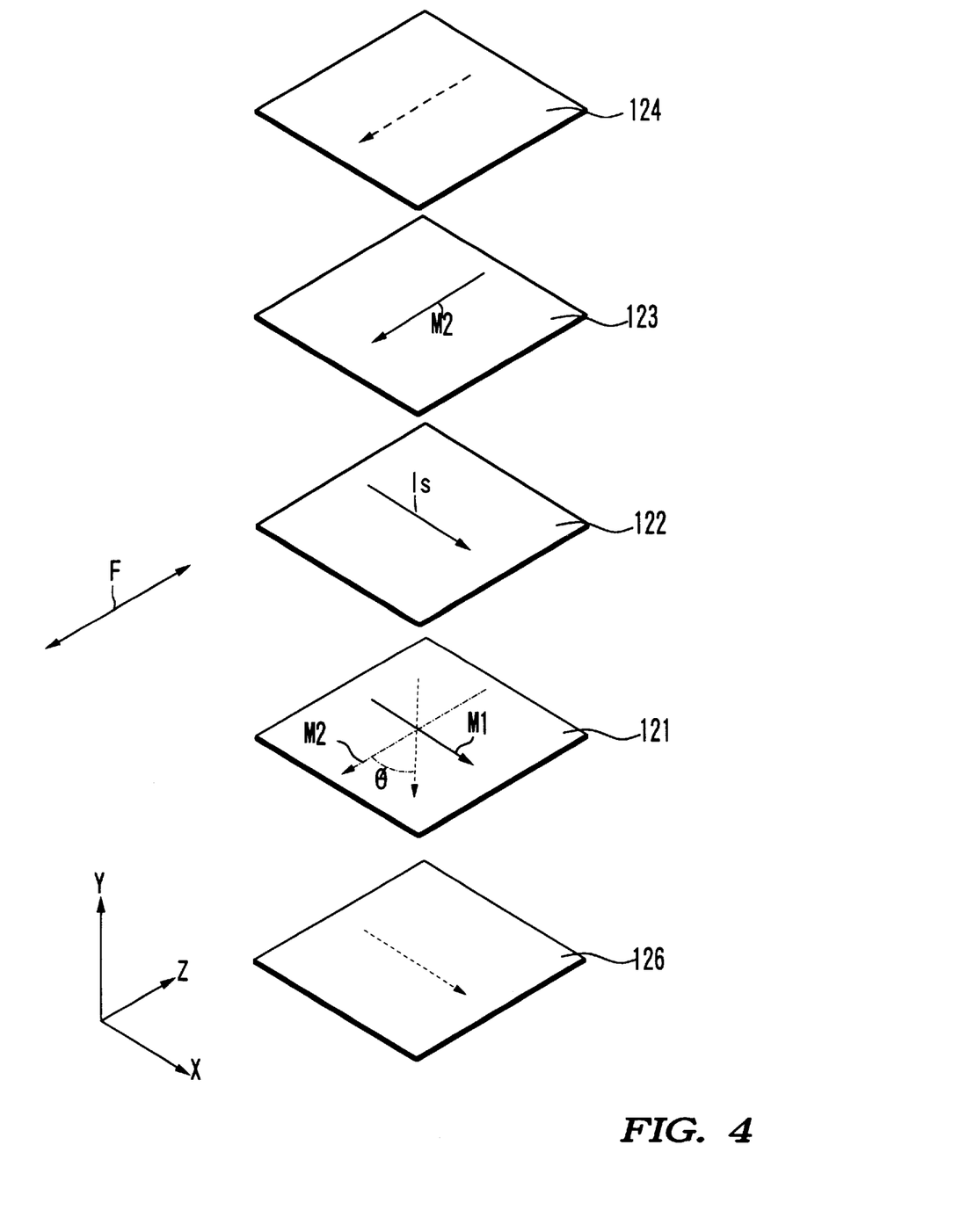
FIG. 4 is an exploded perspective illustrating the structure of the magnetic transducer element shown in FIG. 3 clearly.

FIG. 3 shows a magnetic transducer element according to the present invention which uses a spin valve film structure and FIG. 4 is an exploded view provided to illustrate the structure of the magnetic transducer element shown in FIG. 3 clearly. The central active area 1 includes the spin valve film structure comprising films 121 to 124 and a magnetic domain control film 126. Reference number 120 indicates a base film and reference number 125 indicates a protective film.

The spin valve film structure is constituted by sequentially laminating a first ferromagnetic film 121, a non-magnetic film 122, a second ferromagnetic film 123 and an anti-ferromagnetic film 124. In the structure described above, the second ferromagnetic film 123 (pinned layer) which is in contact with the anti-ferromagnetic film 124, is in a state in which it is magnetized in a specific direction.

When an external magnetic field (F) is applied, the magnetization direction M1 of the first ferromagnetic film 121, which is a free layer, rotates in correspondence to the intensity of the external magnetic field (F). The magnetoresistance ratio of the spin valve film is determined by an angle θ (see FIG. 4) of the magnetization direction M1 of the first ferromagnetic film 121 relative to the magnetization direction M2 of the second ferromagnetic film 123 which constitutes the pinned layer. The magnetoresistance ratio of the spin valve film structure is at its maximum when the magnetization direction M1 of the first ferromagnetic film 121 is reversed from the magnetization direction M2 of the second ferromagnetic film 123 and is at its minimum when the magnetization direction M1 matches the magnetization direction M2. The magnetoresistance ratio in that case varies depending upon the choice of materials, the layer thickness and the like.

The magnetic domain control film 126 is formed below the first ferromagnetic film 121. The magnetic domain control film 126 is, preferably, formed from an anti-ferromagnetic film constituted of NiMn, to provide an exchange-coupling with the first ferromagnetic film 121 so that an exchange bias magnetic field is applied to the first ferromagnetic film 121. The exchange bias magnetic field applied to the first ferromagnetic film 121 by the magnetic domain control film 126 is taken in direction (X), which runs at a right angle to the direction (Z) of the exchange bias magnetic field applied to the second ferromagnetic film 123 by the anti-ferromagnetic film 124. In such a structure, the magnetic domain of the first ferromagnetic film 121 can be controlled with the exchange bias applied by the magnetic domain control film 126 to suppress Barkhausen noise.

While the exchange bias magnetic field applied by the magnetic domain control film 126 is required to have a magnitude that is large enough to create a single magnetic domain in the first ferromagnetic film 121 in, for instance, direction (X), if it becomes too large, the reversal of magnetization of the first ferromagnetic film 121 is dulled, reducing the magnetic field sensitivity. Consequently, it is desirable to set the exchange bias magnetic field applied by the magnetic domain control film 126 at the minimum whereby a single magnetic domain can be achieved in the first ferromagnetic film 121. More specifically, the exchange bias magnetic field applied by the anti-ferromagnetic film 124 to the second ferromagnetic film 123 is set to be at least three times greater than the exchange bias magnetic field applied by the magnetic domain control film 126 to the first ferromagnetic film 121.

With the embodiment shown in FIGS. 3 and 4, too, the various films constituting the spin valve films 121 to 124 and the magnetic domain control film 126 can be formed through photolithographic processes, film forming processes and the like, belonging in one manufacturing process.

In addition, the lead conductor films 21 and 22 are provided on top of the supporting body 3 at the two sides of the central active area 1 constituted with the spin valve film structure in direction (X) running at a right angle to direction (Y) of the lamination of the central active area 1, and each lead conductor film comes in contact with a side end surface of the central active area 1 to terminate the side end surface of the central active area 1. The effective magnetic transducing area is determined by the width of the central active area 1 measured along the direction of the pair of lead conductor films 21 and 22. Because of this, the effective magnetic transducing area can be defined at a specific value with a high degree of accuracy to facilitate reduction in the width of the tracks and thus, optimal operation is assured.

In the central active area 1, the films 121 to 124 constituting the spin valve film structure, each cover the entire surface of the film that is provided under to support it. Because of this, no magnetoresistance effect is generated in the end passive areas, which do not constitute part of the magnetic transducing area and, thus, generation of noise signals is suppressed.

Furthermore, the central active area 1 can be formed by sequentially laminating the films 121 to 124 constituting the spin valve film structure and the magnetic domain control film 126 on top of the supporting body 3 in a specific order. Because of this, the spin valve film structure constituting films 121 to 124 and the magnetic domain control film 126 can be formed through photolithographic processes, film forming processes and the like belonging in one and the same manufacturing process to improve productivity.

Moreover, the embodiment shown in FIGS. 3 and 4 discloses a notable combination in which the anti-ferromagnetic film 124 is constituted of FeMn and the magnetic domain control film 126 is formed with an anti-ferromagnetic film constituted of NiMn. As explained earlier, the direction of the exchange bias magnetic field of the anti-ferromagnetic film 124 and the direction of the exchange bias magnetic field of the magnetic domain control film 126 constituted with an anti-ferromagnetic film must extend at right angles to each other. When the anti-ferromagnetic film 124 is constituted of FeMn and the magnetic domain control film 126 is formed with an anti-ferromagnetic film constituted of NiMn, it is possible to change only the direction of the exchange bias magnetic field of the anti-ferromagnetic film 124 constituted of FeMn by controlling the temperature of the annealing process in the magnetic field and the number of times such process is performed so that the exchange bias magnetic field of the anti-ferromagnetic film 124 and the exchange bias magnetic field of the magnetic domain control film 126 are made to extend at right angles to each other. In this manner, the exchange bias magnetic field of the anti-ferromagnetic film 124 and the exchange bias magnetic field of the magnetic domain control film 126 can be made to extend at right angles to each other reliably and easily.

Figure 5:
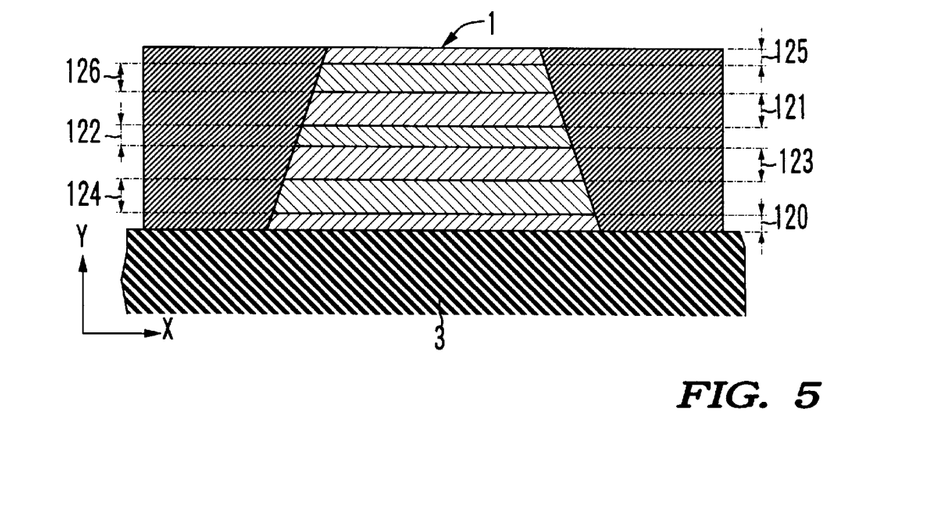
FIG. 5 shows another embodiment of the magnetic transducer element according to the present invention employing a spin valve film configuration.

FIG. 5 shows another embodiment of a magnetic transducer element according to the present invention that employs a spin valve film structure. In the figure, the same reference numbers as those used in FIGS. 3 and 4 are used to indicate identical components. This embodiment is characterized in that the order of lamination of the layers constituting the spin valve film 121 to 124 is reversed from that in the embodiment shown in FIGS. 3 and 4, to provide the magnetic domain control film 126 on top of the first ferromagnetic film 121.

The magnetic transducer elements described above may be produced easily by persons skilled in the art. A specific example is given below. First, a manufacturing method for the magnetic transducer element shown in FIG. 1, which satisfies a prerequisite for application to a thin film magnetic head, is described. On top of an insulating film of $Al_2O_3$, $SiO_2$ or the like, which is formed on top of a base body constituted of $Al_2O_3$—TiC or the like constituting the slider, 170 Å of NiFeRh constituting the transverse bias film (SAL) film 112, 100 Å of Ta constituting the magnetic separation film 113, 250 Å of NiFe constituting the anisotropic magnetoresistance effect film 111 and NiMn constituting the anti-ferromagnetic film 114, are laminated sequentially.

Next, after coating a photoresist on top of the anti-ferromagnetic film 114, a mask is formed with a pattern for achieving the central active area 1, which approximately corresponds to the track width. Then the unmasked areas are removed through a method such as ion milling. At this time, the incident angle of a beam is controlled by inclining the substrate and the laminated films as appropriate relative to the incident beam and the unmasked areas are removed while rotating the substrate. With this, curved or linear tapers are formed at the two end portions of the laminated films.

Next, W (tungusten) is formed to achieve a film thickness of 1000 Å to constitute the lead conductor films 21 and 22. Then, the resist and the lead conductor films on the resist are removed through a lift-off process.

The magnetic transducer element shown in FIG. 2, too, can be manufactured through a similar manufacturing method. However, the actual manufacturing process differs from the production of the magnetic transducer element shown in FIG. 1 in that the order in which the films constituting the central active area 1 are laminated is different and that a base film 115 constituted of Ta with a film thickness of, for instance, 50 Å is provided at the lowermost layer.

NiMn, which is used as a material to constitute the anti-ferromagnetic film 114 in the embodiment above, demonstrates anti-ferromagnetism after annealing in a magnetic field. This material also changes its exchange bias magnetic field depending upon the annealing temperature in the magnetic field and the number of annealing cycles. In this embodiment, by controlling the annealing temperature in the magnetic field and the number of annealing cycles such annealing process is performed, the exchange bias magnetic field is set at approximately 25 (Oe).

Now the manufacturing method for the magnetic transducer element shown in FIGS. 3 and 4 are described. After forming a base layer 120 of Ta at a film thickness of 50 Å the anti-ferromagnetic film 126 is formed with NiMn at a film thickness of 100 Å. Then, on top of the anti-ferromagnetic film 126, the first ferromagnetic film 121 is formed of NiFe to at a thickness of 100 Å, the non magnetic film 122 is formed of Cu at a thickness of 25 Å, a second ferromagnetic film 123 is formed of Co at a thickness of 30 Å and the anti-ferromagnetic film 124 is formed of FeMn at a film thickness of 120 Å. Finally, the protective film 125 is deposited. After this, by performing a process similar to that through which the magnetic transducer element in FIG. 1 is obtained, the magnetic transducer element with a spin valve film structure, shown in FIGS. 3 and 4, is obtained.

The magnetic transducer element shown in FIG. 5 can be manufactured by changing the order of lamination to achieve the spin valve film structure.

The spin valve film structure in the embodiments shown in FIGS. 3 to 5 all demonstrate a magnetoresistance ratio of approximately 3.5%, achieving an output approximately 2.5 times that when an anisotropic magnetoresistance effect film is employed. Since the direction of the exchange bias magnetic field of the anti-ferromagnetic film 124 constituted of FeMn and the direction of the exchange bias field of the anti-ferromagnetic film 126 constituted of NiMn must extend at right angles to each other, annealing process is first performed at 250° C. while applying a magnetic field of 1k (Oe) in the direction of the exchange bias magnetic field of the anti-ferromagnetic film 126 constituted of NiMn and then annealing process is performed at 160° C. in the magnetic field so that only the direction of the exchange bias magnetic field of the anti-ferromagnetic film 124 constituted of FeMn is changed.

Figure 6:
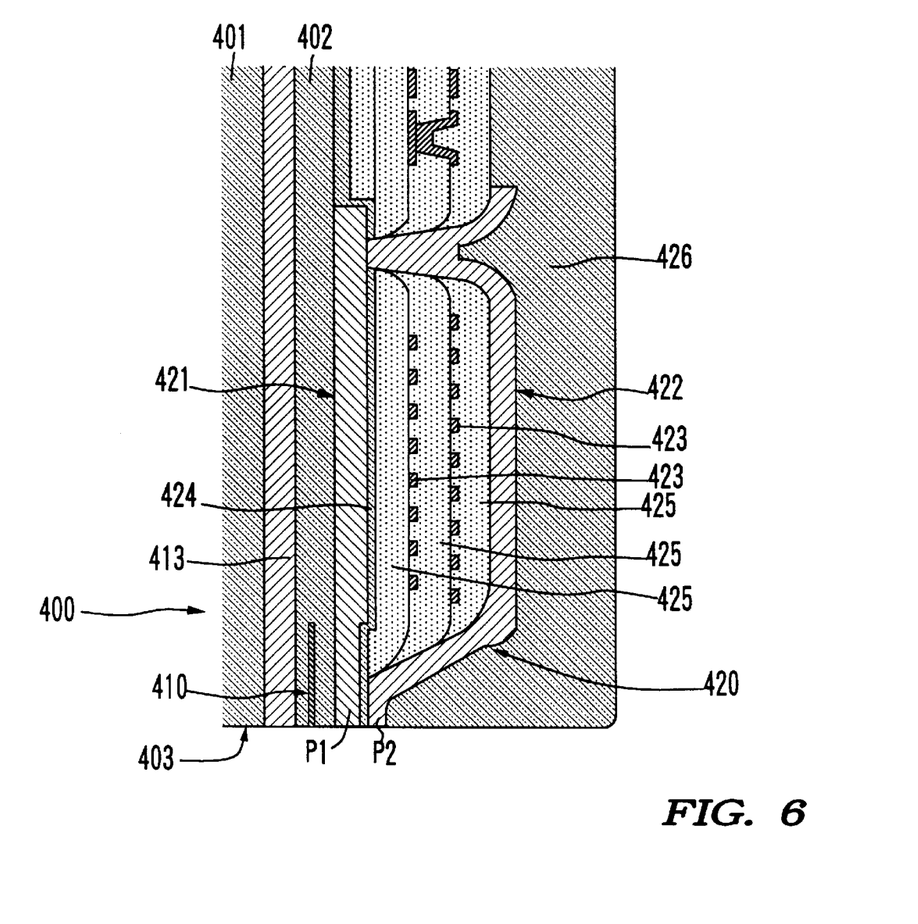
FIG. 6 is a cross section of a thin film magnetic head employing one of the magnetic transducer elements according to the present invention.

FIG. 6 shows an enlarged cross section of a thin film magnetic head which employs one of the magnetic transducer elements described above for a read element and employs an inductive magnetic transducer element for a write element. The thin film magnetic head in the figure is provided with a read element 410 constituted with a magnetic transducer element which utilizes a magnetoresistance effect and a write element 420 constituted with an inductive type magnetic transducer element, on a slider 400.

The slider 400 is constituted with a ceramic structure and is provided with an insulating film 401 constituted of $Al_2O_3$, $SiO_2$ or the like on top of a base body constituted of $Al_2O_3$—TiC or the like. The slider 400 is provided with an air bearing surface (hereafter referred to as an ABS) 403 on the side facing opposite a magnetic disk. The slider 400 may be of the type in the prior art, which is provided with a rail portion on the surface facing the magnetic disk with the surface of the rail portion constituting the ABS or of the type, also in the prior art, in which the surface facing opposite the magnetic disk is a flat surface with no rail portion so that almost the entire surface constitutes the ABS. The read element 410 is embedded in layers inside the insulating film 402. The read element 410 is constituted with one of the magnetic transducer elements according to the present invention described earlier. Thus, the effects and advantages of the MR type magnetic transducer elements according to the present invention are undiminished. Reference number 413 indicates a lower shield film which may be constituted with a magnetic film such as permalloy.

The write element 420, which includes a lower magnetic film 421, an upper magnetic film 422, a coil film 423, a gap film 424, constituted of alumina or the like, an insulating film 425, constituted of an organic resin such as novolak resin or the like, a protective film 426 and the like laminated on top of the insulating film 402. The front ends of the lower magnetic film 421 and the upper magnetic film 422 constitute pole tips P1 and P2 which face opposite each other across the gap film 424 with a very small thickness and write is performed at the pole tips P1 and P2. In the back gap portion constituted with the yolk portion of the lower magnetic film 421 and the upper magnetic film 422 which are on the opposite side from the pole portions P1 and P2, the link completes the magnetic circuit. The coil film 423 is formed on top of the insulating film 425 in such a manner that it coils around the linked area of the yolk portion. While the figure shows a magnetic head for in-plane read/write, the magnetic head may be used for vertical magnetic read/write and the like.

What is claimed is:

1. A magnetoresistance effect transducer element comprising:
   a laminated film structure that generates a magnetoresistance effect;
   a magnetic domain control film that applies a bias magnetic field to said laminated film structure;
   a pair of lead conductor films;
   said laminated film structure and said magnetic domain control film are laminated to one another to form a continuous central active area;
   said laminated film structure layer and said magnetic domain control film extend fully from one lateral side of the central active area to an opposite lateral side of the central active area;
   said pair of lead conductor films are respectively formed on each said lateral side along a lateral side end surface in a direction at a right angle to a direction of lamination of said central active area;
   and at least one of said lateral side end surfaces extends obliquely in said direction of lamination of said central active area.

2. The transducer element according to claim 1, wherein said laminated film structure comprises:
   an anisotropic magnetoresistance effect film;
   a traverse bias film;
   a magnetic separation film;
   wherein said anisotropic magnetoresistance effect film and said traverse bias film are laminated together by said magnetic separation film; and
   wherein said magnetic domain control film is laminated with said anisotropic magnetoresistance effect film on a surface opposite to a surface on which said traverse bias film and said magnetic separation film are provided.

3. The transducer element according to claim 2, wherein said magnetic domain control film is provided on top of said anisotropic magnetoresistance effect film.

4. The transducer element according to claim 2, wherein said magnetic domain control film is provided under said anisotropic magnetoresistance effect film.

5. The transducer element according to claim 2, wherein said magnetic domain control film is an anti-ferromagnetic film which applies an exchange bias magnetic field to said anisotropic magnetoresistance effect film through an exchange-coupling generated between said magnetic domain control film and said anisotropic magnetoresistance effect film.

6. The transducer element according to claim 5, wherein said anti-ferromagnetic film is made of a material selected from the group consisting of NiMm, FeMn, NiO, $C_0O$ or $Fe_2O_3$.

7. The transducer element according to claim 1, wherein said laminated film structure is a spin valve film structure comprising:
   a first ferromagnetic film;
   a non-magnetic film;
   second ferromagnetic film;
   an anti-ferromagnetic film; and
   wherein said magnetic domain control film applies a first exchange bias magnetic field to said first ferromagnetic film, the first exchange bias magnetic field being at a right angle to a second exchange bias magnetic field applied to said second ferromagnetic film by said anti-ferromagnetic film.

8. The transducer element according to claim 7, wherein said second exchange bias magnetic field is three times greater than said first exchange bias magnetic field.

9. The transducer element according to claim 7, wherein said magnetic domain control film is an anti-ferromagnetic film made of a material selected from the group consisting of NiMn, FeMn, NiO, $C_0O$ or $Fe_2O_3$.

10. A thin film magnetoresistance effect transducer element supported by a slider, said magnetoresistance effect transducer element comprising:
    a laminated film structure that generates a magnetoresistance effect;
    a magnetic domain control film that applies a bias magnetic field to said laminated film structure;
    a pair of lead conductor films;
    said laminated film structure and said magnetic domain control film are laminated to one another to form a continuous central active area;
    said laminated film structure layer and said magnetic domain control film extend from one lateral side of the central active area to an opposite lateral side of the central active area;
    said pair of lead conductor films are respectively formed on each said lateral side along a lateral side end surface in a direction at a right angle to a direction of lamination of said central active area;
    and at least one of said lateral side end surfaces extends obliquely in said direction of lamination of said central active area.

11. The thin film transducer element according to claim 10, wherein said laminated film structure comprises:
    an anisotropic magnetoresistance effect film;
    a traverse bias film;
    a magnetic separation film;
    wherein said anisotropic magnetoresistance effect film and said traverse bias film are laminated together via said magnetic separation film; and
    wherein said magnetic domain control film is laminated with said anisotropic magnetoresistance effect film on a surface opposite to a surface on which said traverse bias film and said magnetic separation film are provided.

12. The thin film transducer element according to claim 11, wherein said magnetic domain control film is provided on top of said anisotropic magnetoresistance effect film.

13. The thin film transducer element according to claim 11, wherein said magnetic domain control film is provided under said anisotropic magnetoresistance effect film.

14. The thin film transducer element according to claim 11, wherein said magnetic domain control film is an anti-ferromagnetic film which applies an exchange bias magnetic field to said anisotropic magnetoresistance effect film through an exchange-coupling generated between said magnetic domain control film and said an anisotropic magnetoresistance effect film.

15. The thin film transducer element according to claim 14, wherein said anti-ferromagnetic film is made of a material selected from the group consisting of NiMn, FeMn, NiO, $C_0O$ or $Fe_2O_3$.

16. The thin film transducer element according to claim 10, wherein said laminated film structure is a spin valve film structure comprising:

a first ferromagnetic film;

a non-magnetic film;

a second ferromagnetic film;

an anti-ferromagnetic film; and wherein said magnetic domain control film applies a first exchange bias magnetic field to said first ferromagnetic film, the first exchange bias magnetic field being at a right angle to a second exchange bias magnetic field applied to said second ferromagnetic film by said anti-ferromagnetic film.

17. The thin film transducer element according to claim 16, wherein said second exchange bias magnetic field is three times greater than said first exchange bias magnetic field.

18. The thin film transducer element according to claim 16, wherein said magnetic domain control film includes a further anti-ferromagnetic film made of a material selected from the group consisting of NiMn, FeMn, NiO, $C_0O$ or $Fe_2O_3$.

* * * * *